United States Patent
Wright (10) Patent No.: US 10,498,970 B2
(45) Date of Patent: *Dec. 3, 2019

(54) PROGRAMMABLE MANUAL MODE FOR DIGITAL CAMERAS

(71) Applicant: Donald Frederick Wright, Graz (AT)

(72) Inventor: Donald Frederick Wright, Graz (AT)

( * ) Notice: Subject to any disclaimer, the term of this patent is extended or adjusted under 35 U.S.C. 154(b) by 0 days.

This patent is subject to a terminal disclaimer.

(21) Appl. No.: 16/085,575

(22) PCT Filed: Mar. 13, 2017

(86) PCT No.: PCT/US2017/022010
§ 371 (c)(1),
(2) Date: Sep. 15, 2018

(87) PCT Pub. No.: WO2017/160673
PCT Pub. Date: Sep. 21, 2017

(65) Prior Publication Data
US 2019/0098192 A1    Mar. 28, 2019

Related U.S. Application Data

(63) Continuation of application No. 15/341,856, filed on Nov. 2, 2016, now Pat. No. 9,574,455.

(60) Provisional application No. 62/308,276, filed on Mar. 15, 2016.

(51) Int. Cl.
*H04N 5/235* (2006.01)
*H04N 5/232* (2006.01)

(52) U.S. Cl.
CPC ....... *H04N 5/2352* (2013.01); *H04N 5/23222* (2013.01)

(58) Field of Classification Search
CPC .................. H04N 5/2352; H04N 5/23222
See application file for complete search history.

(56) References Cited

U.S. PATENT DOCUMENTS

| | | | | |
|---|---|---|---|---|
| 5,831,676 A * | 11/1998 | Takahashi | ............ | H04N 5/2351 348/362 |
| 6,806,907 B1 * | 10/2004 | Tamura | ................ | H04N 5/2352 348/333.01 |
| 7,817,206 B2 * | 10/2010 | Bell | ...................... | H04N 5/2351 348/229.1 |
| 8,305,487 B2 | 11/2012 | Cha et al. | | |
| 8,446,481 B1 | 5/2013 | Geiss | | |
| 9,674,455 B1 * | 6/2017 | Wright, Jr. | ........... | H04N 5/2352 |
| 2007/0147820 A1 | 6/2007 | Steinberg et al. | | |
| 2007/0171282 A1 | 7/2007 | Yanagi | | |

(Continued)

*Primary Examiner* — Timothy J Henn
(74) *Attorney, Agent, or Firm* — Fishman Stewart PLLC (57) ABSTRACT

"Programmed manual modes" mimic the processes a digital camera user goes through manually, but at the speed of the processor built in the camera. Each program preferably includes an exposure condition and a set of exposure parameters, with each exposure parameter having a plurality of exposure settings and a plurality of exposure setting priorities. The processor automatically applies an exposure value from each exposure setting and determines if the exposure condition is met. If the exposure condition is met, the processor captures and stores the image. If not, the processor applies a different exposure value and determines if the exposure condition is met based on the different exposure value.

20 Claims, 4 Drawing Sheets

(56) References Cited

U.S. PATENT DOCUMENTS

| | | |
|---|---|---|
| 2013/0050507 A1 | 2/2013 | Syed et al. |
| 2015/0189171 A1 | 7/2015 | Yim et al. |
| 2015/0229826 A1 | 8/2015 | Ikeda et al. |
| 2015/0244937 A1 | 8/2015 | Kunishige et al. |

\* cited by examiner

PROGRAMMABLE MANUAL MODE FOR DIGITAL CAMERAS

REFERENCE TO RELATED APPLICATION

This application is a US National Phase of PCT/US2017/022010, filed Mar. 13, 2017, which claims priority to U.S. Provisional Application 62/308,276, filed Mach 15, 2016 and U.S. patent application Ser. No. 15/341,856, filed Nov. 2, 2016 (U.S. Pat. No. 9,674,455, issued Jun. 6, 2017), the contents of which are incorporated by reference in their entirety.

FIELD OF THE INVENTION

This invention relates generally to digital photography and, in particular, to a user programmable manual mode for digital cameras.

BACKGROUND OF THE INVENTION

There are typically three phases associated with taking a photo. These phases will herein be referred to as "Pre-Compose," "Compose," and "Shutter Release." In each phase, the operator typically has many settings at their disposal to achieve the photo they desire.

Pre-Compose is the time before the photographer begins to compose the picture. This is usually not a time-critical phase, and the photographer adjusts common parameters such as:

Shooting mode: This is a setting that sets the camera for how many pictures to take upon release of the shutter from 1 picture per shutter release to continuous shooting while the shutter button is held down;

Bracketing: Where the camera takes multiple photos in succession at different exposures;

Focus modes: Selecting how the camera will focus. This typically ranges from a single small point to a wide area of the image and the camera finds the closest object and focuses on that. There are typically also settings to describe how the camera tracks the objects to focus, one time focus, etc.; and Metering: Selecting how the computer in the camera analyzes what the camera is pointed at and calculates the exposure of the image. There are typically several different ways to tell the camera how to meter the exposure for the image.

Compose is the time when the photographer composes the picture and is typically a very time critical phase. This typically starts when the photographer presses the shutter button halfway or pressing a button to start the metering and focus process. The camera then feeds back the level of exposure based on the settings of the camera. The photographer then adjusts the settings of the camera to expose the photo to the desired level. These settings typically include:

ISO: this is the setting for the sensitivity of the sensor to light. The higher the setting, the more sensitive the sensor is which allows taking an image in darker situations. However, this higher sensitivity often leads to artifacts (commonly referred to as noise) in the picture;

Shutter speed: This is the amount of time the shutter is open to expose the sensor to the light it needs to record the image. The faster the shutter speed, the less time the sensor is exposed, and the slower the shutter speed, the longer the sensor is exposed. This is dependent on the amount of light available. If there is little light then a longer exposure is needed. However, this often results in blurry shots because either the camera or the subject moves during the time the shutter is open. Sometimes this shutter is left open purposely to capture this motion or blur artistically;

Aperture: The aperture setting refers to the amount the lens is open to let in light. A very large aperture lets in the most light, but has the shortest depth of field (the amount of the image that is "in focus"). The smallest aperture has the largest depth of field, but lets in the least amount of light; and Exposure: This controls how much the photographer would like to over or under expose an image typically to make sure the main subject is exposed correctly if there are very bright or dark subjects in the image affecting the exposure measurement.

Shutter Release occurs when the photographer completely presses the shutter button and captures the image or images.

The primary parameters the photographer adjusts during photo shoots are what are called the pyramid of light: ISO, Aperture, and Shutter Speed. All three of these control how the light is used to compose the image. Adjusting any of these three elements affects the other two and photographers are constantly adjusting these three to get the image exposed how they desire in a crisp and clear image.

While many photographers prefer to set these settings themselves, many cameras have some form of "Automatic Mode" that uses the camera's intelligence to quickly make many of these setting decisions for the photographer. Nevertheless, photographers that want to exert more manual control than the "Automatic Mode" are continually adjusting these settings during their shots. Many cameras allow photographers to store settings that they wish to start with, usually in a menu or on the mode dial (sometimes called "Custom"), so that the photographer can quickly select the base settings they want to start with when they begin shooting. However, since the shots are always changing, the photographer has to move away from these base settings and quickly to adjust many of the parameters listed above for each shot.

The camera provides feedback to the photographer (typically in the viewfinder) about the exposure of the shot with the current settings, what the settings are, and then the photographer adjusts dials (or menus) to get the settings what they think they want, and take a shot. Then, typically the shooter looks at the shot on the built in screen on the camera to get an idea if the shot is what they desire and then usually they modify some settings and continue the shooting. However, most of the adjustments are made manually.

Some modes of operation try to "automate" these procedures. Modes like "aperture priority" and "shutter priority" allow the photographer to set one of the settings like aperture or shutter speed and then the camera does the adjustment of the other to maintain a properly exposed image. Some cameras even offer an automatic setting for ISO which even helps with the third leg of pyramid to allow the photographer to only have to adjust one of the three parameters. Such modes add convenience, but there remains a considerable amount of manual adjustment to be done during most shots. And since it is done manually by the photographer, it takes a significant amount of time when compared to the speed of the built-in camera computer that does this during automatic mode.

SUMMARY OF THE INVENTION

In digital photography, this invention bridges a gap between full manual and automatic shooting modes, enabling a user to create "programmed manual modes" (also referable to herein as "programs") that mimic the processes the user goes through manually, but at the speed of the computer built in the camera. The invention encompasses apparatus in the form of cameras modified in accordance with the invention, as well as associated methods of programming and use.

A digital camera according to the invention includes a user control associated with taking a picture, a memory for storing a digital image, and a processor for controlling camera function. However, in contrast to existing cameras, the processor is also operative to receive user defined programs including an exposure condition and a set of shooting parameters, each parameter having a range and a priority. When the user control is activated, the processor automatically applies the parameters in sequential fashion within their ranges based upon their priorities, causing the camera to take a picture if and when the exposure condition is met. The exposure condition may be variable and adjusted as the parameters are sequentially applied.

The shooting parameters associated with the programmed manual modes (i.e., user created programs or user defined programs) include one or more of ISO, aperture and shutter speed, and the ranges generally include upper or lower limits. The programs may be created in the camera or using a device other than the camera and downloaded into the camera, and the programs may be written in a format that can be shared with other camera users. The processor is further operative to store the sequence of parameters in a memory used by the camera when the control is activated.

The program preferably includes one or more pre-compose settings to establish bracketing, exposure, focus and shot sequence. Such pre-compose settings could further include settings for a flash, GPS unit, intervalometer, movement device or other apparatus built in, attached to, or in communication with the camera.

DETAILED DESCRIPTION OF THE INVENTION

In broad and general terms, this invention allows a photographer to use the speed and accuracy of the computer built in the camera (typically already used for the built in "automatic mode") to perform sequential or continual adjustments to create their own "programmed manual modes" (i.e., "programs") for their photography. This is accomplished by allowing the photographer or "user" to create "rules" or "macros" or "decisions" (herein referred to as "programs" or "user created programs") which mimic the process they go through manually, but at the speed of the computer built in the camera.

Figure 3:
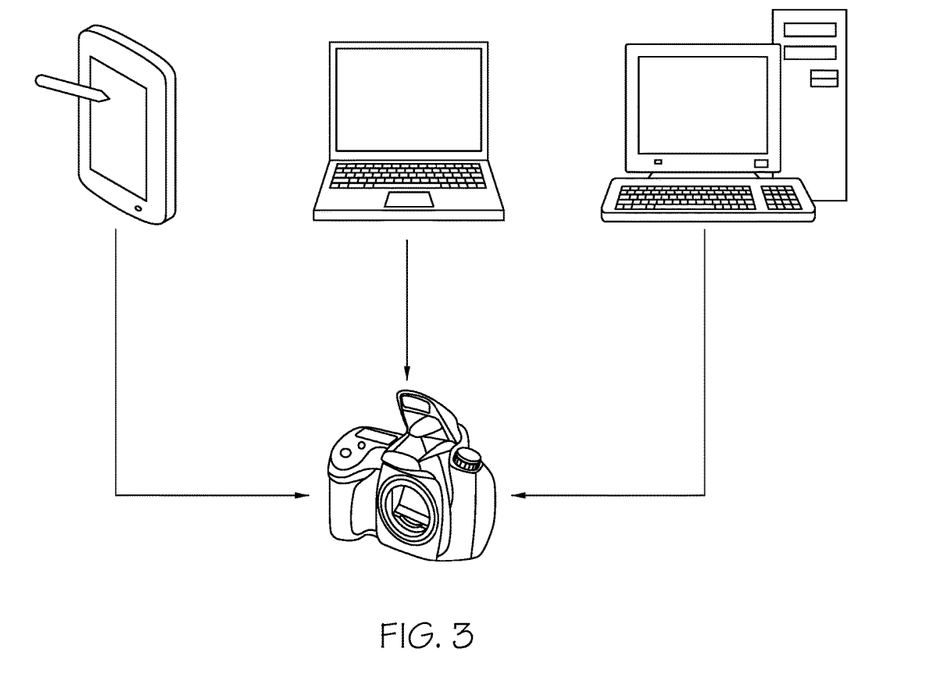
FIG. 3 is a diagram that shows how manual-mode programs may be developed on a PC, tablet, or smart phone using editing software.

These user created programs can be created and modified on the camera or on a separate device and then stored in the camera. Furthermore these user created programs can be basic .xml or other types of files which would allow photographers to share their user created programs on social networks or other forms of communication to allow other photographers use their user created programs. As shown in FIG. 3, these user created programs would most often be built using software running on a PC, tablet, or smart phone using some kind of editor that will allow the user to build their programs, name them, give them a description, etc.

The user then can download the user created programs to the camera using the memory card, using wireless, or with a cable. The camera could have the capability of holding many user created programs depending on the memory size storing the programs in the camera. For example, have 99 "slots" to store programs in and then the user can select which slot is the active program during shooting. Note that, as used herein, "camera" means any device that has an image sensor, memory and processing electronics enabling still or sequential imagery to be gathered, displayed, stored and/or transmitted. As such, "digital camera" includes a smart phone with one or more sensors/cameras. Further, the same device used to build the user created programs described herein may be used to take the pictures and/or gather the imagery made possible by the user created programs.

The user created programs could be in the form of a block diagram or flow chart, or even just using a chart. For example:
Pre-Compose Starting Settings:
Bracketing: off
Exposure mode: center
Focus: spot
Focus mode: One shot
Shooting mode: Single shot Chart Example For the chart shown in FIG. 1, a possibility could be that for each step the user can enter the upper and lower limits for the different settings and the priority of each and the camera would quickly start with the initial settings and then quickly adjust the settings through the ranges based on priority. If at any time the shot criteria is met, the camera takes a photo. If not, it goes to the next step to try.
Pre-Compose Starting Settings:
Bracketing: off
Exposure mode: center
Focus: spot
Focus mode: One shot
Shooting mode: Single shot

Figure 1:
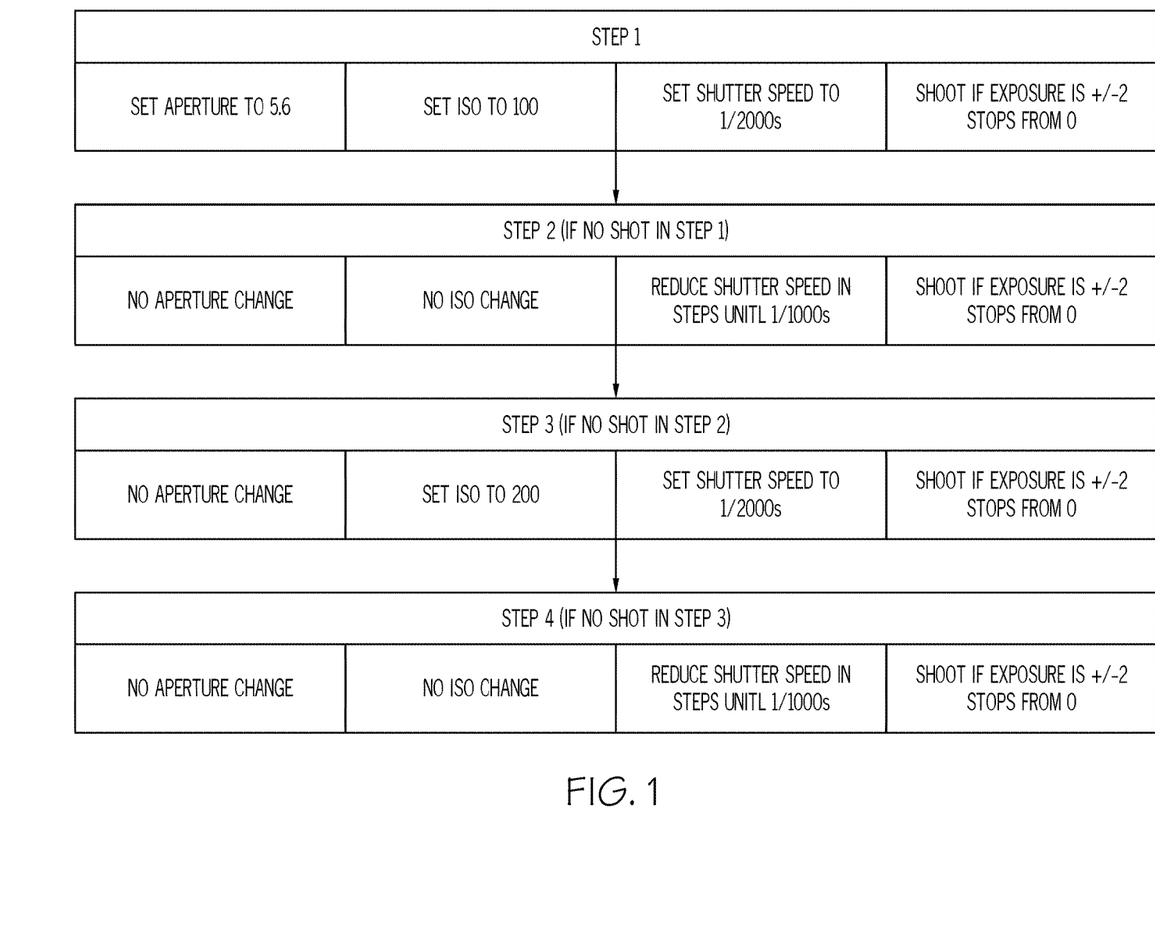
FIG. 1 shows one possible decision tree according to the invention wherein, for each step the user can enter upper and lower limits and priority for different settings enabling the camera to automatically start with the initial settings and then quickly adjust the settings through the ranges based on priority.

| Aperture Range | Priority | ISO Range | Priority | Shutter Speed Range | Priority | Shot Criteria |
|---|---|---|---|---|---|---|
| 10-5.6 | 2 | 100-400 | 3 | 2000-1000 | 1 | Exposure +/−1 stop from 0 |

-continued

| Aperture Range | Priority | ISO Range | Priority | Shutter Speed Range | Priority | Shot Criteria |
|---|---|---|---|---|---|---|
| 10-5.6 | 2 | 100-800 | 3 | 2000-1000 | 1 | Exposure +/−2 stops from 0 |
| 5.6-2.8 | 2 | 100-800 | 3 | 2000-1000 | 1 | Exposure +/−2 stops from 0 |
| 5.6-2.8 | 1 | 100-800 | 2 | 1000-640 | 3 | Exposure +/−3 stops from 0 |
| ... | | | | | | |

In this example, the camera would first set the aperture to 10, the ISO to 100, and the shutter speed to 2000 and if the exposure is within 1 stop from 0, the photo will be taken. If it is outside the shot criteria, if the exposure is too high, it could give a warning that the exposure is higher than the starting point of the program. Typically, the user would have very high initial settings and the camera would need to compensate for underexposure. If the exposure is to low, the camera would start adjusting the lowest priority item to try and get the right exposure. In this case, raise the ISO from 100 to 200 and then check the exposure. If within the criteria, take the shot. If not, raise the ISO to 400. Check the criteria and take the shot if exposure is within the criteria. If not, since the ISO upper range is met, the camera returns the ISO to 100 and then changes the next priority item which is the aperture. It sets the aperture to the next value in the range and then repeats the cycle by adjusting the ISO to see if the shot criteria can be met. It can do this for all three settings and ranges and if not able to take a shot, go to the next step.

The camera would also have the ability to allow the user to modify the user defined programs using the screen on the back of the camera. This would not be the standard method as it would not be as efficient as using the programming software on a separate device.

Figure 2:
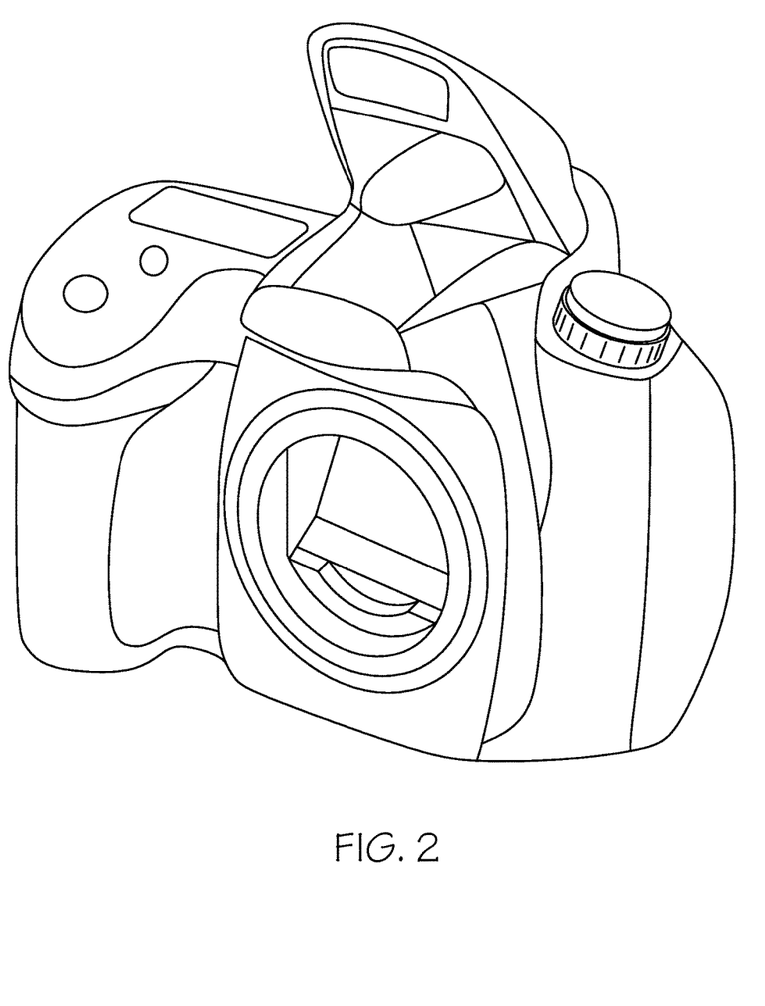
FIG. 2 is a drawing of a digital camera without a lens showing a possible location for a program quick selection knob.

Furthermore, camera could have some way for the user to store some favorite user defined programs that can be quickly selected on a quick selection knob located on the camera, shown in FIG. 2.

EXAMPLES

Program Name: Sports 1
Pre-Compose Starting Settings:
Bracketing: off
Exposure mode: center
Focus: Zone
Focus mode: Continuous (Servo)
Shooting mode: High Speed Continuous

| Aperture Range | Priority | ISO Range | Priority | Shutter Speed Range | Priority | Shot Criteria |
|---|---|---|---|---|---|---|
| 10-5.6 | 2 | 100-400 | 3 | 2000 | 1 | Exposure +/−1 stop from 0 |
| 10-5.6 | 2 | 100-800 | 3 | 2000 | 1 | Exposure +/−2 stops from 0 |
| 5.6-2.8 | 2 | 100-800 | 3 | 2000 | 1 | Exposure +/−2 stops from 0 |
| 5.6-2.8 | 3 | 800-1600 | 2 | 2000 | 1 | Exposure +/−3 stops from 0 |
| ... | | | | | | |

Since for sports, a high shutter speed is usually important, the user may choose shutter speed to always be ½000s, but to adjust first the ISO for the first three steps followed by the aperture. In the fourth step, to really try and get the shot by adjusting the aperture first, followed by an even wider range of ISO and wider shot criteria.

Program Name: Sunset Beach 1
Pre-Compose Starting Settings:
Bracketing: off
Exposure mode: center
Focus: Zone
Focus mode: One Shot
Shooting mode: Single Shot

| Aperture Range | Priority | ISO Range | Priority | Shutter Speed Range | Priority | Shot Criteria |
|---|---|---|---|---|---|---|
| 10-12 | 2 | 100-400 | 3 | 5 s-2.5 s | 1 | Exposure +/−1 stop from 0 |
| 12-16 | 2 | 100-400 | 3 | 5 s-2.5 s | 1 | Exposure +/−2 stops from 0 |
| 16-22 | 2 | 100-400 | 3 | 5 s-2.5 s | 1 | Exposure +/−2 stops from 0 |
| ... | | | | | | |

For this sunset beach example, the user has a much different use case. Typically the photographer starts shooting before the sun sets and the conditions are bright, yet the photographer wants to capture a long exposure to smooth the water. So, when the camera firsts tries to take the shot, the shot is over exposed. In this case, the camera tries the lowest priority setting which is ISO. But, since it started at 100 and it is already over exposed and by moving it to 200 it will just increase the exposure, the camera immediately moves to priority 2. It then changes the aperture to 12 and sees if the criteria is met; if not, it moves to priority 1 which is to lower the shutter speed and try again. If it still is too over exposed, it moves to step two, and so on. This process continues until the shot is taken, unless the scene is just too bright for this user defined program to take a picture.

Program Name: Portrait 1
Pre-Compose Starting Settings:
Bracketing: off
Exposure mode: center
Focus: Zone
Focus mode: One Shot
Shooting mode: Single Shot

| Aperture Range | Priority | ISO Range | Priority | Shutter Speed Range | Priority | Shot Criteria |
|---|---|---|---|---|---|---|
| 1.4 | 1 | 100-400 | 3 | 1000-640 | 2 | Exposure +/−1 stop from 0 |
| 1.4 | 1 | 100-400 | 2 | 800-320 | 3 | Exposure +/−2 stops from 0 |
| 1.4 | 1 | 100-800 | 3 | 640-125 | 2 | Exposure +/−3 stops from 0 |
| ... | | | | | | |

For portrait photography, often the photographer used a very shallow depth of field to keep the eyes of the subject in sharp focus, but then make the rest of the face softer using the shallow depth of field. So this user defined program keeps the depth of field at 1.4 throughout but adjusts the ISO and shutter speeds to get the desired photo. First in the first step it tries to adjust the ISO and then the shutter speed.

Additionally, the camera could use an external button to hold the current settings that have been "found" by the user defined program. So, if the user defined program had to go to step three to find that ISO400, aperture 5.6 and shutter speed 640 gives the desired exposure, by pressing or holding this button those settings are held in memory until the camera is told to start at the beginning again with the user defined program. When the user defined program starts and stops could also be part of the user defined program settings.

Note that the camera may also be programmed to record the steps it took to achieve the condition to take the picture. The photographer can then look back at a photo and see how many steps it took and the decisions the computer in the camera made to get to the point of taking the picture. This could be stored somehow in the metadata for the photo or in a separate file.

The user defined programs could also have settings like bracketing and how many stops to bracket, HDR settings, autofocus modes, metering modes, shooting modes, etc. programmed into the program. The user could also copy, modify, and save the user defined programs on the camera in the field and then upload them back to the original program in the computer, tablet, smartphone, etc. for saving.

For low-light applications where a flash is used, the pre-compose settings could also include the settings for the flash. Another option could be that the flash settings could also be adjusted in the user defined program to try to achieve the desired exposure using the different flash settings. In situations where multiple flashes are used, the system could also set the parameters for each flash or adjust them based on the user defined program.

The user defined program could also be able to set the pre-compose settings for any other built in or attached devices such as GPS units, intervalometer, movement devices, etc.

The programming software would incorporate a friendly graphical user interface to generate the user defined programs. It would also control the uploads and downloads to the camera and could even have the possibility of uploading or saving as a file that can be shared (or sold) to other users to allow users to create a community of shared user defined programs that users can use in their cameras.

For photographers that want to generate a business by selling their user defined programs, and encryption method could be used to make viewing, editing, changing the user defined programs unavailable, or even only partly encrypted (so the user could change certain settings of the program).

Figure 4:
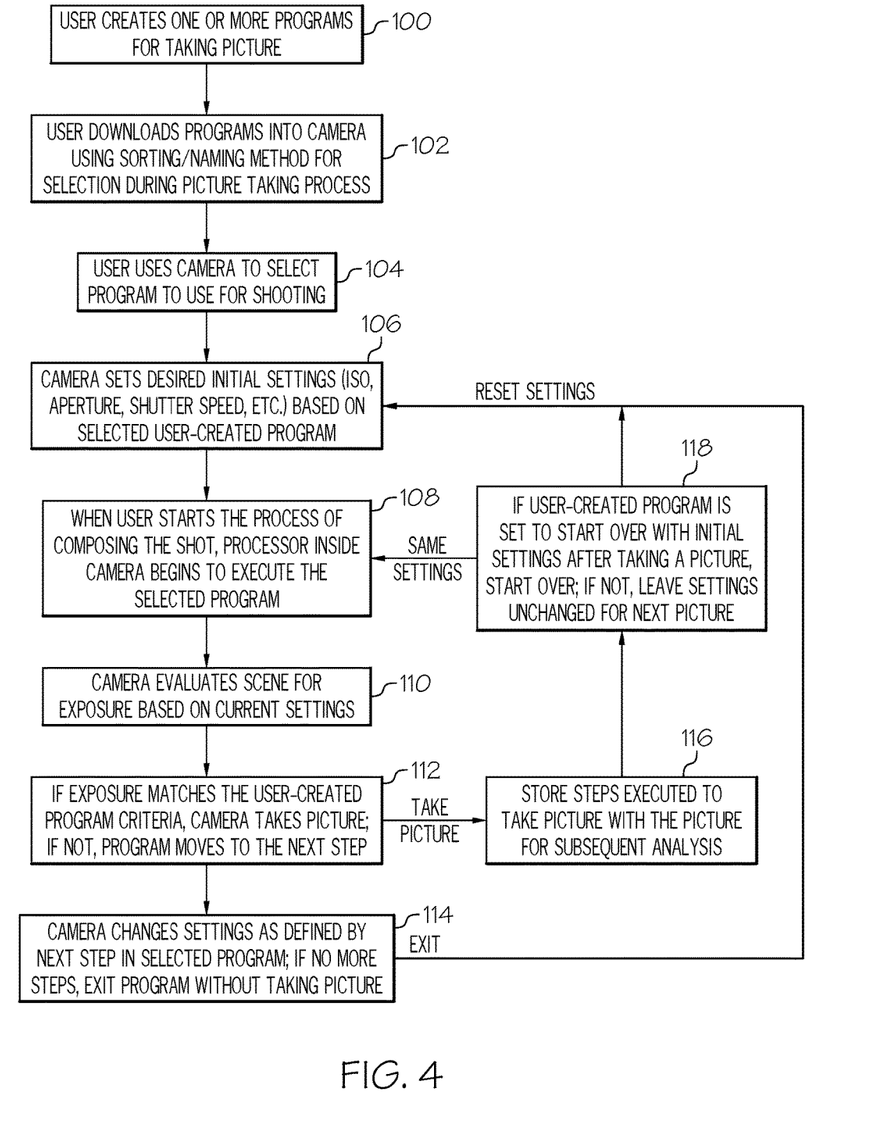
FIG. 4 is a flow chart of a process to create a user-created, programmed manual mode as a user-created, manual-mode program, and to select and execute the manual-mode program through a digital camera, which process may be employed by a processor inside the digital camera to progress through the selected user defined program to take a picture according to one or more embodiments as shown and described herein.

FIG. 4 illustrates an embodiment of a flow chart of a process to create a user-created, programmed manual mode as a user-created, manual-mode program, and to select and execute the manual-mode program through a digital camera. In step 100, a user creates one or more programs (i.e., as one or more of a plurality of user-created, programmed manual modes) for taking a picture through, for example, a computer or handheld device such as a digital camera. The user may be able to share the one or more user-created, programmed manual modes with other users as physical media that is sharable over the Internet, World Wide Web, and/or through other media storage and/or transmission aspects. Thus, each user-created, programmed manual mode may be written in a format configured to be shared with other camera users. In embodiments, each user-created, programmed manual mode is created in the digital camera or using a device other than the digital camera and downloaded into the digital camera. For example, in step 102, a user may download the one or more user-created, programmed manual modes into a digital camera. The user may use a method for sorting and/or naming the one or more user-created, programmed manual modes that are downloaded for selection during a picture taking process.

In embodiments, a digital camera such as one shown in FIGS. 2-3 and including a memory for storing the plurality of user-created, programmed manual modes may include a user control associated with taking a picture. The user control enables a user to select one of a plurality of user-created, programmed manual modes as an active shooting mode. In step 104 of FIG. 4, the user uses the user control of the digital camera to select a user-created, programmed manual mode from the plurality of user-created, programmed manual modes stored in the memory of the digital camera to use for taking the picture as the active shooting mode. Thus, a method of taking a picture may include a step of selecting as an active shooting mode, and through a user control, one of a plurality of user-created, programmed manual modes from a memory of a digital camera having the user control associated with taking a picture. A processor of the digital camera may be operative to receive and store one of the user-created, programmed manual modes when selected with the user control.

Further, each of the user-created programmed manual modes may include an exposure condition and a set of shooting parameters. Each shooting parameter has a range of exposure settings and a parameter priority, each range of exposure settings includes an upper limit and a lower limit, and each parameter priority define an order in which the shooting parameters are automatically adjusted, relative to each other, to meet the exposure condition.

The processor of the digital camera may further be operative to automatically apply the shooting parameters of the selected user-created, programmed manual mode in a sequence that is based on the parameter priority associated with each shooting parameter. In embodiments, the exposure condition of the selected user-created, programmed manual mode is variable and configured to be adjusted as the shooting parameters are applied in the sequence. The processor may be further operative to store the sequence of shooting parameters in the memory used by the digital camera.

The shooting parameters may be applied by adjusting the applied parameter within its range of exposure settings until the exposure condition is met or, if the range of settings is exhausted without meeting the exposure condition, advancing the sequence of applying the shooting parameters to a lower priority shooting parameter until the exposure condition is met. In embodiments, the shooting parameters include one or more of ISO, aperture, and shutter speed. Further, each user-created, programmed manual mode may include one or more pre-compose settings comprising bracketing on/off, exposure mode, focus mode, single shot sequence, and multiple shot sequence. The one or more pre-compose settings may further comprise settings for a flash. The digital camera may further include one or more additional pre-compose settings for an apparatus that is at least one of built in, attached to, and in communication with the digital camera. The apparatus may comprise one of a GPS unit, an intervalometer, a movement device, and the like.

For example, in step 106, the digital camera sets the desired initial settings (such as ISO, aperture, shutter speed, and the like) based on the selected user-created, programmed manual mode. In step 108, when the user starts the process of composing the shot, the processor inside the digital camera begins to execute the selected user-created, programmed manual mode. In step 110, the processor of the digital camera evaluates a scene for exposure based on the current setting. In step 112, if the exposure matches the criteria of the selected user-created, programmed manual mode, the camera takes the picture to proceed to step 116 in which the steps executed to take the picture are stored along with the picture for subsequently analysis. The processor of the digital camera is operative to cause the digital camera to take a picture and store the picture in the memory when the exposure condition of the selected user-created, programmed manual mode is met. The user may be able to download the picture and analyze it at a later time. In step 118, the processor of the digital camera determines if the selected user-created, programmed manual mode is set to start over with the initial settings after taking a picture. If so, the process proceeds to reset settings and repeat from step 106. If not, the process leaves the settings unchanged for the next picture to be taken and proceeds with the same settings back step 108.

If, in step 112, the exposure does not match the criteria of the selected user-created, programmed manual mode, the selected user-created, programmed manual mode instructs the processor of the digital camera to move to the next step in the program. In step 114, the digital camera changes settings as defined by the next step in the selected program and repeats the process between steps 112 and 114. For example, the digital camera changes settings as defined by the next step until the exposure matches the criteria of the selected user-created, programmed manual mode to take the picture or until no more steps are available. At the point at which no more steps are available, the processors exits the program without taking a picture and may proceed to step 106 with reset settings.

A signal may be "generated" by direct or indirect calculation or measurement, with or without the aid of a sensor.

For the purposes of describing and defining the present invention, it is noted that reference herein to a variable being a "function" of (or "based on") a parameter or another variable is not intended to denote that the variable is exclusively a function of or based on the listed parameter or variable. Rather, reference herein to a variable that is a "function" of or "based on" a listed parameter is intended to be open ended such that the variable may be a function of (or based on) a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

The invention claimed is:

1. A digital camera comprising:
   a memory for storing a program mode comprising an exposure condition and a set of exposure parameters; and
   a processor operative to set the program mode as an active shooting mode;
   wherein the set of exposure parameters comprises:
   a plurality of exposure settings comprising one or more exposure values for each exposure setting; and
   a plurality of exposure setting priorities, each exposure setting priority associated with a respective exposure setting of the plurality of exposure settings;
   wherein the processor is further operative to:
   apply one exposure value from each of the plurality of exposure settings during a compose mode prior to capturing an image;
   determine if the exposure condition is met in response to the application of the one exposure value from each of the plurality of exposure settings;
   if the exposure condition is met, capture the image and store the image in the memory; and
   if the exposure condition is not met:
   apply a different exposure value from one of the plurality of exposure settings based on its exposure setting priority; and
   determine if the exposure condition is met in response to the application of the different exposure value.

2. The digital camera of claim 1, wherein each exposure setting of the plurality of exposure settings comprises an upper limit and a lower limit; and
   wherein the one or more exposure values comprise a first exposure value equal to the upper limit and a second exposure value equal to the lower limit.

3. The digital camera of claim 2, wherein the processor, in being operative to apply the different exposure value, is operative to:
   determine whether each of the one or more exposure values of an exposure setting of the plurality of exposure settings having a lowest exposure setting priority has been applied;
   if each of the one or more exposure values of the exposure setting having the lowest exposure setting priority has not been applied, apply a distinct exposure value selected from the one or more exposure values of the exposure setting having the lowest exposure setting priority.

4. The digital camera of claim 3, wherein the processor, in being operative to apply the different exposure value, is operative to:
   if each of the one or more exposure values of the exposure setting having the lowest exposure setting priority has been applied, apply a distinct exposure value selected from the one or more exposure values of an exposure setting of the plurality of exposure settings having a next exposure setting priority.

5. The digital camera of claim 1, wherein the plurality of exposure settings comprises:
   an ISO exposure setting;
   an aperture exposure setting; and
   a shutter speed exposure setting.

6. The digital camera of claim 1, wherein the exposure condition comprises at least one exposure value defining an exposure of the image to be captured.

7. The digital camera of claim 6, wherein the processor, in being operative to determine if the exposure condition is met, is operative to:
determining an exposure of the image to be captured; and
comparing the exposure of the image to be captured with the at least one exposure value.

8. The digital camera of claim 6, wherein the at least one exposure value comprises an upper limit and a lower limit; and
wherein the processor is configured to determine if the exposure condition is met by:
determining an exposure of the image to be captured; and
determining whether an image exposure value of the exposure of the image to be captured is one of equal to one of the upper limit and the lower limit and between the upper limit and the lower limit.

9. The digital camera of claim 1, wherein the exposure condition and the set of exposure parameters of the program mode comprise a first exposure set; and
wherein the program mode further comprises a second exposure set comprising an exposure condition and a set of exposure parameters, wherein at least one of the exposure condition of the second exposure set is distinct from the exposure condition of the first exposure set and the set of exposure parameters of the second exposure set is distinct from the set of exposure parameters of the first exposure set; and
wherein, if the exposure condition of the first exposure set is not met based on the application of any of the exposure values from each of the plurality of exposure settings of the first exposure set, the processor is further operative to:
apply one exposure value from each of the plurality of exposure settings of the second exposure set during the compose mode prior to capturing the image;
determine if the exposure condition of the second exposure set is met in response to the application of the one exposure value from each of the plurality of exposure settings of the second exposure set;
if the exposure condition of the second exposure set is met, capture the image and store the image in the memory; and
if the exposure condition of the second exposure set is not met:
apply a different exposure value from one of the plurality of exposure settings of the second exposure set based on its exposure setting priority; and
determine if the exposure condition of the second exposure set is met in response to the application of the different exposure value of the second exposure set.

10. A digital camera, comprising:
a memory for storing one or more user-created, programmed manual modes, each of the user-created, programmed manual modes comprising:
an exposure condition and a set of shooting parameters, each shooting parameter having a range of exposure settings and a parameter priority, and each parameter priority defining an order in which the shooting parameters are automatically adjusted, relative to each other, to meet the exposure condition; and
a processor operative to:
receive a user input selecting a user-created, programmed manual mode from the one or more user-created, programmed manual modes;
store the user-created, programmed manual mode as an active shooting mode;
automatically apply the shooting parameters of the active shooting mode in a sequence based on the parameter priority associated with each shooting parameter, wherein the shooting parameters are applied by adjusting each applied shooting parameter within its range of exposure settings until the exposure condition is met or, if the range of exposure settings is exhausted without meeting the exposure condition, advancing the sequence of applying the shooting parameters based on the parameter priority of each shooting parameter until the exposure condition is met; and
cause the digital camera to take a picture and store the picture in the memory when the exposure condition of the active shooting mode is met.

11. The digital camera of claim 10, further comprising a user control associated with taking a picture, the user control enabling a user to select the user-created, programmed manual mode; and
wherein the processor is further operative to receive the user input from the user control.

12. The digital camera of claim 10, wherein the set of shooting parameters includes one or more of ISO, aperture, and shutter speed.

13. The digital camera of claim 10, wherein each user-created, programmed manual mode is created in the digital camera or using a device other than the digital camera and downloaded into the digital camera.

14. The digital camera of claim 10, wherein each user-created, programmed manual mode is written in a format configured to be shared with other camera users.

15. The digital camera of claim 10, wherein each user-created, programmed manual mode includes one or more pre-compose settings comprising bracketing on/off, exposure mode, focus mode, single shot sequence, and multiple shot sequence.

16. The digital camera of claim 15, wherein the one or more pre-compose settings further comprise settings for a flash.

17. The digital camera of claim 15, further comprising one or more additional pre-compose settings for an apparatus that is at least one of built in, attached to, and in communication with the digital camera.

18. The digital camera of claim 10, wherein the exposure condition of the active shooting mode is variable and configured to be adjusted as the shooting parameters of the set of shooting parameters are applied in the sequence.

19. A method of taking a picture, comprising the steps of:
setting as an active shooting mode, a user-created, programmed manual mode from a memory of a digital camera, wherein:
the user-created, programmed manual mode comprises an exposure condition and a set of shooting parameters;
each shooting parameter comprises at least one exposure setting and a parameter priority;
each range of exposure settings comprises an upper limit and a lower limit; and
each parameter priority defines an order in which the shooting parameters are automatically adjusted, relative to each other;
automatically applying the shooting parameters of the user-created, programmed manual mode in a sequence based on the parameter priority associated with each shooting parameter, wherein the shooting parameters are applied by adjusting each applied shooting parameter within its range of exposure settings until the exposure condition is met or, if the range of exposure settings is exhausted without meeting the exposure condition, advancing the sequence of applying the shooting parameters to a different shooting parameter; and taking a picture and storing the picture in memory in response to the exposure condition of the active shooting mode being met.

20. The method of claim 19, wherein the set of shooting parameters includes one or more of ISO, aperture, and shutter speed.

\* \* \* \* \*

UNITED STATES PATENT AND TRADEMARK OFFICE
CERTIFICATE OF CORRECTION

PATENT NO. : 10,498,970 B2  
APPLICATION NO. : 16/085575  
DATED : December 3, 2019  
INVENTOR(S) : Donald Frederick Wright

Page 1 of 1

It is certified that error appears in the above-identified patent and that said Letters Patent is hereby corrected as shown below:

On the Title Page

At Column 1, Item (63) under Related U.S. Application Data, please change "Pat. No. 9,574,455" to "Pat. No. 9,674,455".

Signed and Sealed this
Twenty-eighth Day of July, 2020

Andrei Iancu
*Director of the United States Patent and Trademark Office*